(12) United States Patent
Diochon et al.

(10) Patent No.: US 7,971,825 B2
(45) Date of Patent: Jul. 5, 2011

(54) AIRCRAFT JET ENGINE PYLON SUSPENSION ATTACHMENT

(75) Inventors: Lionel Diochon, Toulouse (FR); Michael Sarrato, Madrid (ES); David Chartier, Toulouse (FR); Isabelle Petrissans, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 240 days.

(21) Appl. No.: 11/915,223

(22) PCT Filed: May 22, 2006

(86) PCT No.: PCT/FR2006/050467
§ 371 (c)(1),
(2), (4) Date: May 1, 2008

(87) PCT Pub. No.: WO2007/000544
PCT Pub. Date: Jan. 4, 2007

(65) Prior Publication Data
US 2008/0191088 A1    Aug. 14, 2008

(30) Foreign Application Priority Data
May 23, 2005   (FR) .................................. 05 51331

(51) Int. Cl.
*B64D 27/18* (2006.01)
*B64D 27/26* (2006.01)
(52) U.S. Cl. ....................................................... 244/54
(58) Field of Classification Search .................... 244/54, 244/53 R; 248/554
See application file for complete search history.

(56) References Cited

U.S. PATENT DOCUMENTS

| 3,848,832 A | | 11/1974 | Stanley et al. | |
|---|---|---|---|---|
| 3,952,973 A | * | 4/1976 | James | 244/54 |
| 3,979,087 A | | 9/1976 | Boris et al. | |
| 4,266,741 A | | 5/1981 | Murphy | |
| 5,497,961 A | * | 3/1996 | Newton | 244/54 |
| 5,524,847 A | * | 6/1996 | Brodell et al. | 244/54 |
| 6,126,110 A | | 10/2000 | Seaquist et al. | |
| 6,347,765 B1 | * | 2/2002 | Jule et al. | 244/54 |
| 2005/0116093 A1 | * | 6/2005 | Machado et al. | 244/54 |

FOREIGN PATENT DOCUMENTS

FR    2 799 432    4/2001

OTHER PUBLICATIONS

U.S. Appl. No. 12/089,058, filed Apr. 3, 2008, Diochon, et al.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

The invention relates to a turbojet suspension pylon for an aircraft, the pylon being provided with a rigid structure (10) comprising a longitudinal central box (22). According to the invention, the rigid structure also comprises two lateral boxes (24a, 24b) fixed to a forward part of said central box (22), the pylon also comprising a first (6a) and a second (6b) engine forward suspension designed to resist forces applied along the longitudinal direction (X) of the pylon, these first and second suspensions being arranged on the two lateral boxes respectively.

11 Claims, 6 Drawing Sheets

AIRCRAFT JET ENGINE PYLON SUSPENSION ATTACHMENT

TECHNICAL DOMAIN

This invention relates in general to a turbojet suspension pylon for an aircraft. This type of suspension pylon is also called an EMS (Engine Mounting Structure), and can be used to fit a turbojet below the aircraft wing, or to fit this turbojet above the same wing.

STATE OF PRIOR ART

Such a suspension pylon is designed to form a connecting interface between a turbojet and an aircraft wing. It transmits forces generated by its associated turbojet to the structure of this aircraft, and it also enables routing of fuel, electrical, hydraulic and air systems between the engine and the aircraft.

In order to transmit forces, the pylon comprises a rigid structure frequently of the "box" type, in other words formed by the assembly of upper and lower spars and side panels connected to each other through transverse ribs.

The pylon is also provided with a mounting system inserted between the turbojet and the rigid structure of the pylon, this system globally comprising at least two engine suspensions, usually at least one forward suspension and at least one aft suspension.

Furthermore, the mounting system comprises a device for resisting thrusts generated by the engine. In prior art, this device may for example be in the form of two lateral connecting rods connected firstly to an aft part of the turbojet fan case, and secondly to an engine aft suspension fixed to the central case of the turbojet.

Similarly, the suspension pylon also comprises a second mounting system inserted between the rigid structure of this pylon and the aircraft wing, this second system typically being composed of two or three suspensions.

Finally, the pylon is provided with a secondary structure for segregating and holding systems in place, while supporting aerodynamic fairings.

As described above, a conventional suspension pylon according to prior art is generally in the shape of a parallelepiped box with large dimensions to resist all forces generated by the associated turbojet.

Thus, in this specific case in which the large box shaped suspension pylon is arranged close to the central case of the turbojet, this pylon inevitably creates strong disturbances of the fan flow escaping from the annular fan duct, which results directly in a large drag, and losses in the turbojet efficiency and increased fuel consumption.

Furthermore, these disturbances are accentuated by the presence of thrust resisting devices consisting of lateral rods arranged at the output from the annular fan duct.

OBJECT OF THE INVENTION

Therefore, the object of the invention is to propose a turbojet suspension pylon for an aircraft at least partially overcoming the disadvantages mentioned above related to embodiments according to prior art and also to present an aircraft with at least one such pylon.

To achieve this, the object of the invention is a turbojet suspension pylon for an aircraft, the pylon being provided with a rigid structure comprising a longitudinal central box, this rigid structure also comprising two lateral boxes fixed to a forward part of the central box and each including an upper skin and a lower skin, the pylon also comprising a first and second engine forward suspension designed to resist forces applied along a longitudinal direction of the pylon, the first and second engine forward suspensions being arranged on the two lateral boxes.

Thus, this invention can resist thrusts, in other words forces applied along the longitudinal direction of the pylon, by means of two lateral boxes provided for this purpose. This resistance may be made fully satisfactorily, in the sense that the thrusts passing through the first and second forward suspensions can then easily transit through the skins of these boxes, that can be qualified as stressed skins. Once these forces have been transmitted to an upper end of the lateral boxes, they then reach the longitudinal central box through which they can be transferred along the longitudinal direction towards the back of the pylon.

Similarly, it should be understood that the moment is perfectly resisted along the vertical direction by the two lateral boxes, mainly by means of a forward closing frame and an aft closing frame provided on each of these boxes.

Finally, the same applies for resistance of the moment applied about the longitudinal direction of the pylon, this resistance effectively being provided by the lateral boxes when the first and second forward suspensions are also designed to resist forces applied along the vertical direction of the pylon.

Furthermore, as indicated above, the rigid structure of the suspension pylon comprises a longitudinal central box also called the central torsion box, that extends parallel to the longitudinal axis of the fictitious surface and that is therefore fixed to each of the lateral boxes. Obviously, due to the mechanical strength provided by these lateral boxes, the dimensions (mainly the thickness) of the central box can be smaller than they were in the past. This means that this central box is also capable of only causing very small disturbances to the fan flow output from the annular fan duct.

In this respect, note also that the fact that thrusts are resisted by the first and second engine forward suspensions mounted on the lateral boxes, and no longer by a specific resisting device of the lateral rods type, also provides a means of avoiding fan flow disturbances that occurred formerly due to the presence of these lateral rods at the exit from the annular fan duct.

Preferably, each of the two lateral boxes has a lower skin jointly delimiting part of an approximately cylindrical fictitious surface with a circular section and a preferably longitudinal axis, that can be coincident with the longitudinal axis of the turbojet.

Thus, each of the two lower skins has a curvature such that it extends around this approximately cylindrical circular shaped fictitious surface. Consequently, they jointly form an assembly of the rigid structure that is advantageously capable of being only slightly disturbing to the fan flow escaping from the annular fan duct of the turbojet associated with it, compared with conventional solutions according to prior art in which the suspension pylon was in the form of a large central single parallelepiped shaped box arranged very close to the central case of the turbojet.

It is actually possible to arrange that a diameter of the fictitious surface is approximately identical to a diameter of an outside cylindrical surface of the fan case of the associated turbojet, implying that the rigid assembly formed by the lower skins is then approximately along an extension of this outside surface of the fan case, and more generally along the extension of a peripheral annular part of this case. Naturally, in this specific case in which the two lateral boxes can be treated like an approximately cylindrical portion of an envelope with a circular section and a diameter similar to the diameter of the fan case, fan flow disturbances that might be caused by these boxes are extremely small or even non-existent.

This then has the advantage of obtaining improvements in drag, turbojet efficiency and fuel consumption.

For information, note that if the two lateral boxes can generally be considered as a portion of an envelope that is approximately cylindrical with a circular section, it is preferably in the shape of an approximately cylindrical portion of an envelope with a semi-circular section. Naturally, this preferred shape is quite suitable to facilitate assembly of the turbojet on the rigid structure of the suspension pylon.

Furthermore, as mentioned above, the longitudinal central box located between the two lateral boxes is arranged so as to only generate very small disturbances in the fan flow. To achieve this, it is arranged such that only a very small portion of its lower part projects inside the fictitious surface.

Preferably, each lateral box is closed at the forward end by a forward closing frame oriented along a plane defined by a transverse direction and a vertical direction of the pylon. In such a case, it can be arranged that the first and second engine forward suspensions are fixed to the two forward closing frames of the lateral boxes, so that these two forward suspensions can easily be assembled on the turbojet fan case.

Still preferably, a plane defined by the longitudinal axis of the fictitious surface and a transverse direction of the suspension pylon passes through the first and second engine forward suspensions. Thus, it should be understood that this specific feature advantageously makes it possible to resist thrusts at the turbojet shaft, consequently implying a significant reduction in the longitudinal bending of this shaft.

Preferably, as mentioned above, the first and second engine forward suspensions were each designed so as to resist forces applied along the longitudinal direction of the pylon, and along the vertical direction of this pylon. In this configuration, it would then be possible for the pylon to comprise a plurality of engine suspensions composed of first and second engine forward suspensions located symmetrically about a plane defined by the longitudinal axis of the fictitious surface and the vertical direction of this pylon, a third engine forward suspension through which this plane passes, and an engine aft suspension fixed to the longitudinal central box.

Thus, all engine forward suspensions are designed to be mounted on the fan case, so that they can be located at a significant distance from each other. This large separation distance has the advantage that it can very much simplify the design of these engine suspensions, due to the fact that the forces that they must resist associated with a moment about a given axis, are naturally smaller than the corresponding forces encountered in conventional solutions according to prior art in which the engine suspensions that were fixed to the central case could not be as far away from each other.

Furthermore, these forward suspensions may advantageously be located at a distance from the hot part of the turbojet, which implies a significant reduction in thermal effects that may be applied to these elements.

Furthermore, with such an arrangement that no longer requires the presence of a thrust resistance device of the lateral rods type, all forces generated by the turbojet are resisted essentially on the fan case by means of first, second and third engine forward suspensions, because the only link remaining between the pylon and the central case or the exhaust case is composed of the engine aft suspension, the main role of which is to limit vertical oscillations of the aft part of the turbojet.

Thus, this particular arrangement of engine suspensions induces a considerable reduction in the bending encountered at the central case, regardless of whether this bending is due to thrusts generated by the turbojet or to gusts that may be encountered during the various flight phases of the aircraft.

Consequently, the above-mentioned reduction in bending generates a significant reduction of the friction between rotating compressor and turbine blades and the central case of the engine, and therefore significantly reduces losses of efficiency due to wear of these blades.

In this case in which the plurality of engine suspensions forms a statically determinate mounting system, the third forward suspension is designed so as to resist only forces applied along the transverse direction of the pylon, and the engine aft suspension is designed so as to resist only forces applied along the vertical direction of this pylon.

Thus, the only engine suspension that is not mounted on the engine fan case is the engine aft suspension, designed so as to resist only the forces applied along the vertical direction of the turbojet. This means that if the latter is effectively located in the annular fan flow duct, its function consisting solely of resisting vertical forces requires a relatively small dimension, such that fan flow disturbances caused by this aft suspension are only very minimal. Thus, this enables a significant gain in terms of global engine performances.

Furthermore, in this configuration in which the aft suspension resisting only vertical forces is the only engine suspension located in the annular fan flow duct, then it will be possible that the first, second and third engine suspensions are fixed onto a peripheral annular part of the fan case, so that they can occupy positions in which they are advantageously well separated from each other.

One alternative consists of making the pylon comprise a plurality of engine suspensions composed of first and second engine forward suspensions located symmetrically about a plane defined by the longitudinal axis of the fictitious surface and the vertical direction of this pylon and an engine aft suspension fixed to the longitudinal central box, the third forward suspension consequently being eliminated.

Thus, also with the objective of obtaining a plurality of engine suspensions forming a statically determinate mounting system, the engine aft suspension is then designed so as to resist forces applied along the transverse direction of the pylon and also along the vertical direction of this pylon.

Another purpose of the invention is an aircraft with at least one suspension pylon like that described above.

Other advantages and characteristics of the invention will become clear after reading the detailed non-limitative description given below.

BRIEF DESCRIPTION OF THE DRAWINGS

This description will be made with reference to the appended figures wherein.

DETAILED DESCRIPTION OF PARTICULAR EMBODIMENTS

Figure 1:
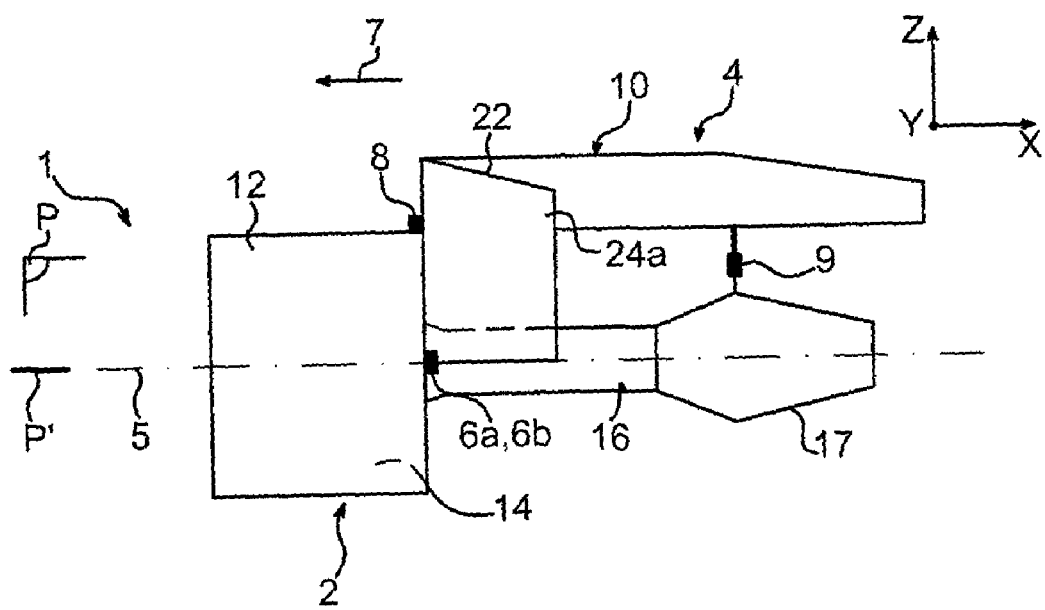
FIG. 1 shows a side view of an aircraft engine assembly, comprising a suspension pylon according to one preferred embodiment of this invention.

With reference to FIG. 1, the figure shows an aircraft engine assembly 1 designed to be fixed under a wing of this aircraft (not shown), this assembly 1 comprising a suspension pylon 4 according to one preferred embodiment of this invention.

Globally, the engine assembly 1 is composed of a turbojet 2 and the suspension pylon 4, the suspension pylon in particular being provided with a plurality of engine suspensions 6a, 6b and 8, 9 and a rigid structure 10 to which these suspensions (suspension 6b being hidden by suspension 6a in this FIG. 1) are fixed. For guidance, note that the assembly 1 is designed to be surrounded by a pod (not shown) and that the suspension pylon 4 comprises another series of suspensions (not shown) to assure suspension of this assembly 1 under the aircraft wing.

Throughout the following description, by convention, X refers to the longitudinal direction of the pylon 4 that is also considered to be the same as the longitudinal direction of the turbojet 2, this X direction being parallel to a longitudinal axis 5 of this turbojet 2. Furthermore, the direction transverse to the pylon 4 is called the Y direction and can also be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

In FIG. 1, it can be seen that only the engine suspensions 6a, 6b, 8, 9 and the rigid structure 10 of the suspension pylon 4 are shown. The other components of this pylon 4 that are not shown, such as the suspension means of the rigid structure 10 under the aircraft wing, or the secondary structure for segregating and holding the systems while supporting aerodynamic fairings, are conventional elements identical to or similar to those encountered in prior art and known by those skilled in the art. Consequently, no detailed description of them will be made.

Furthermore, the turbojet 2 is provided with a large fan case 12 at the forward end delimiting an annular fan duct 14, and being provided near the aft end with a smaller central case 16 enclosing the core of this turbojet. Finally, the central case 16 is prolonged in the aft direction by an exhaust case 17 that is larger than the case 16. Obviously, the cases 12, 16 and 17 are rigidly fixed to each other. As can be seen from above, it is preferably a turbojet with a high by-pass ratio.

As can be seen in FIG. 1, one of the special features of the invention lies in the fact that a first engine forward suspension 6a and a second engine forward suspension 6b are both designed to be fixed onto the fan case 12, symmetrically about a plane P defined by the axis 5 and the Z direction.

Figure 2:
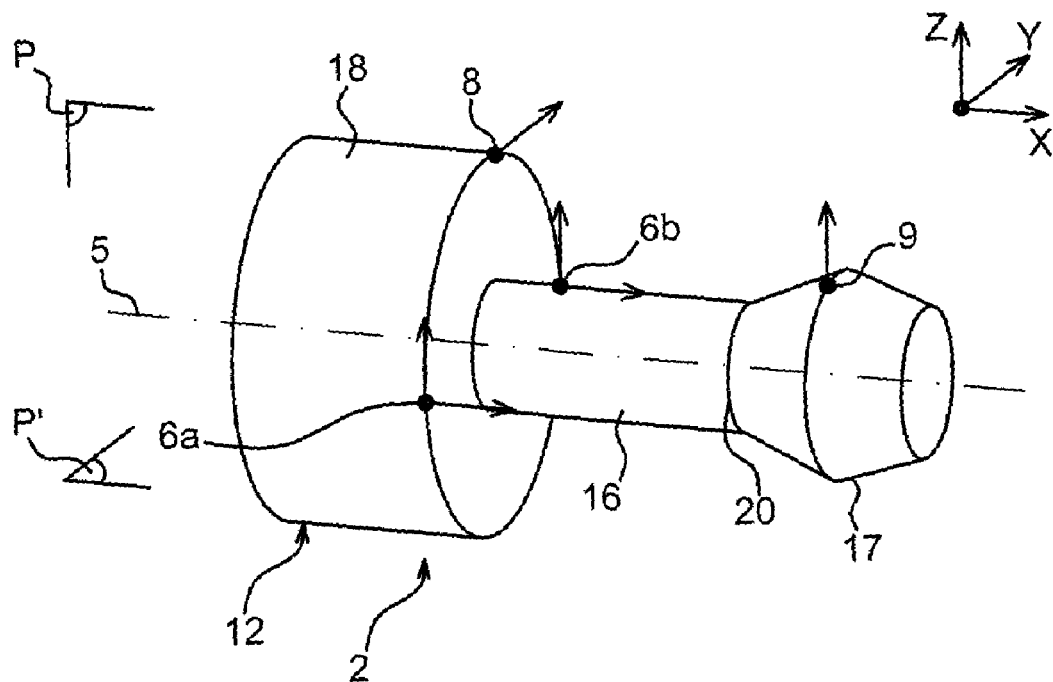
FIG. 2 shows a diagrammatic perspective view of the assembly shown in FIG. 1, the rigid structure of the suspension pylon having been removed to more clearly show the engine suspensions for this same pylon.

Now with reference to FIG. 2, it can be seen that the first suspension 6a and the second suspension 6b shown diagrammatically are arranged symmetrically about this plane P and are preferably both arranged on a peripheral annular part of the fan case 12, and more specifically near the aft end of this part.

It would then be possible for the first and second engine forward suspensions 6a, 6b to be diametrically opposite to each other on the annular peripheral part of the fan case 12 with a cylindrical outside surface 18, such that a second plane P' defined by the longitudinal axis 5 and the Y direction passes through each of these suspensions 6a, 6b.

As shown diagrammatically by the arrows in FIG. 2, each of the first and second engine forward suspensions 6a, 6b is designed so that it can resist forces generated by the turbojet 2 along the X direction and along the Z direction, but not forces applied along the Y direction.

In this way, the two suspensions 6a, 6b at a long distance from each other jointly resist the moment applied along the X direction, and the moment applied along the Z direction.

Still with reference to FIG. 2, a third engine forward suspension 8 shown diagrammatically can be seen, also fixed to the annular peripheral part of the fan case 12, also preferably near the aft end of this part.

The suspensions 6a, 6b, 8 are fixed onto the peripheral annular part of the case 12 by structural parts (not shown) of the engine, that are effectively preferably arranged on the aft part of the annular peripheral part. Nevertheless, it would also be possible to have engines in which the structural parts are located further forwards on the peripheral annular part, such that the suspensions 6a, 6b, 8 are also fixed further forwards on the engine, still on the annular peripheral part of the fan case 12.

Concerning the third suspension 8, it is located on the highest part of the fan case 12, and therefore on the highest part of the peripheral annular part, and consequently the first plane P mentioned above fictitiously passes through it. Furthermore, a YZ plane (not shown) preferably passes through the three suspensions 6a, 6b and 8.

As shown diagrammatically by the arrows in FIG. 2, the third engine suspension 8 is designed so that it can only resist forces generated by the turbojet 2 along the Y direction, but not forces applied along the X and Z directions.

Still with reference to FIG. 2, it can be seen that there is an engine aft suspension 9 shown diagrammatically and fixed between the rigid structure 10 (not shown in this figure) and the exhaust case 17, preferably at the portion of this case 17 with the largest diameter. For guidance, it is noted that the first plane P preferably passes fictitiously through this aft suspension 9.

As shown diagrammatically by the arrows in FIG. 2, the engine aft suspension 9 is designed so that it can only resist forces generated by the turbojet 2 along the Z direction, but not forces applied along the X and Y directions.

In this way, this suspension 9, with the two forward suspensions 6a, 6b, resist the moment applied along the Y direction.

Naturally, this aft suspension 9 could be placed differently, namely on the central case 16 of the turbojet 2, preferably on an aft part of it, or at a junction 20 between the central case 16 and the exhaust case 17.

Therefore in all cases, this aft suspension 9 is located in an annular fan flow duct (not referenced) of the turbojet with a high by-pass ratio. Nevertheless, the fact that its function is limited to resistance of vertical forces implies that it is relatively small, such that fan flow disturbances caused by this aft suspension 9 are only minimal. Thus, this can give a significant gain in terms of the global performances of the turbojet.

Note that if the engine suspensions 6a, 6b, 8 and 9 are shown diagrammatically in FIGS. 1 and 2, it should be understood that these suspensions can be made using any method known to those skilled in the art, for example such as a method related to assembly of shackles and fittings.

As mentioned above, one of the main advantages associated with the configuration that has just been described lies in the fact that the specific position of the engine forward suspensions 6a, 6b, 8 on the fan case 12 causes a significant reduction in bending of the central case 16 during the various aircraft flight situations, and therefore causes a significant drop in wear of the compressor and turbine blades by reduction of the friction in contact with this central case 16.

Figure 3:
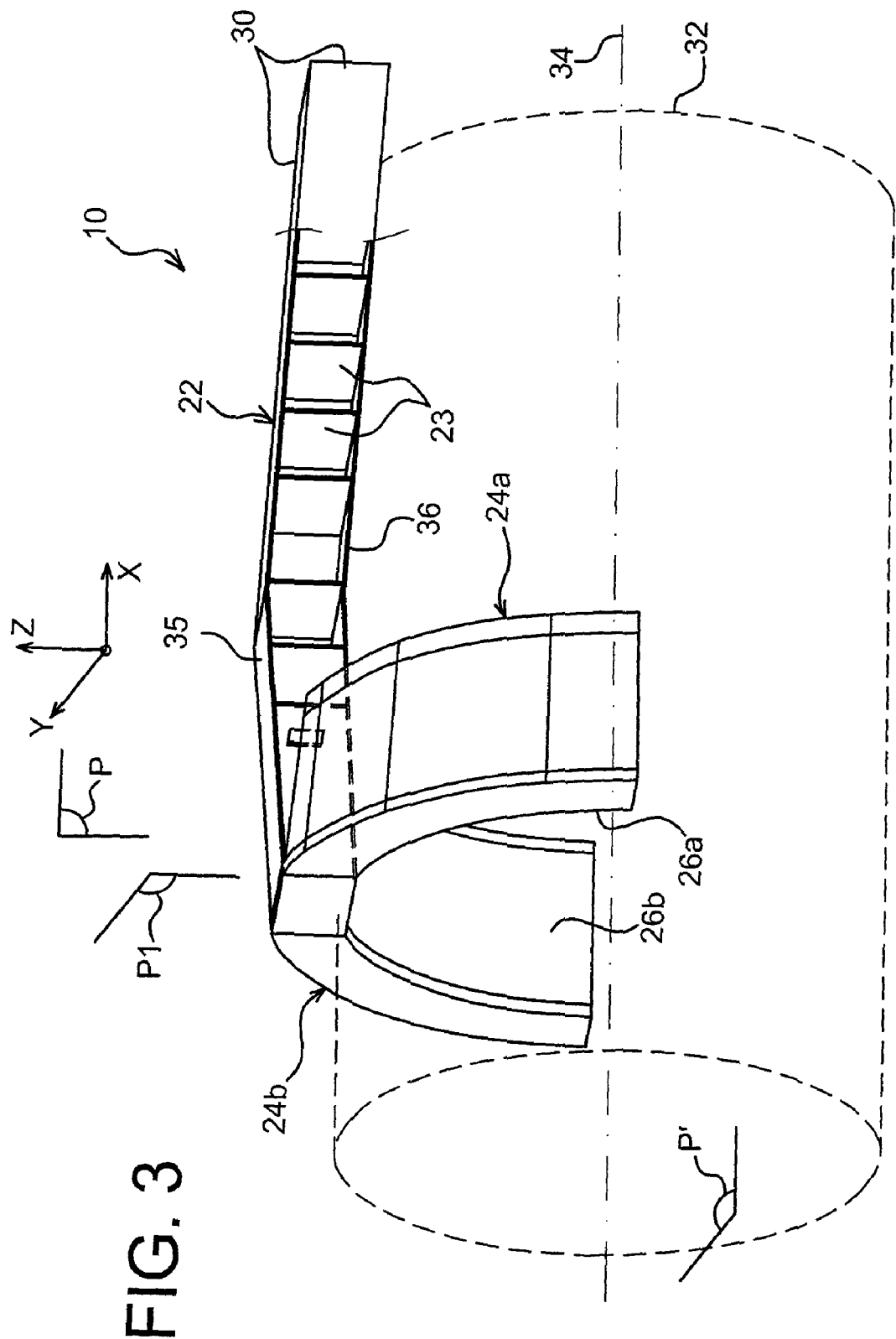
FIG. 3 shows a partial and enlarged perspective view of the suspension pylon according to the preferred embodiment.

With reference now to FIG. 3, the figure shows a detailed view of the rigid structure 10 of the suspension pylon 4 according to this invention, the engine suspensions 6a, 6b, 8, 9 having been deliberately omitted in this figure.

Firstly, note that this rigid structure 10 is designed to be symmetric about a first plane P indicated above, in other words about the vertical plane defined by the longitudinal axis 5 of the turbojet 2, and the Z direction.

This rigid structure 10 comprises a longitudinal central box 22, also called a torsion box, that extends from one end of the structure 10 to the other along the X direction parallel to this direction. For guidance, this box 22 may be formed by the assembly of two lateral spars 30 extending along the X direction in parallel XZ planes, and connected to each other by transverse ribs 23 that are oriented in parallel YZ planes. Furthermore an upper spar 35 and a lower spar 36 are also provided to close the box 22.

Two lateral boxes 24a, 24b are designed to complete the rigid structure 10 for which the central box 22 is located at an upper portion of this same structure 10, each of the two boxes 24a, 24b being fixed to the central torsion box 22 and projecting on each side of it along the Y direction and downwards.

One of the specific features of these lateral boxes added and fixed to the forward part of the central box 22 is that each has a lower skin 26a, 26b facing the turbojet and jointly delimiting a part of an approximately cylindrical fictitious surface 32 with a circular section, and a longitudinal axis 34 parallel to the central box 22 and the X direction, as shown in FIG. 3.

In other words, the curvature of each of these two lower skins 26a, 26b is adapted so that they can be positioned around and in contact with this fictitious surface 32 over their entire length. Thus, in general, the two boxes 24a, 24b form a portion of an approximately cylindrical envelope/cage with a circular section that can be positioned around and at a distance from the central case 16 of the turbojet 2.

For guidance, note that the axis 34 is preferably coincident with the longitudinal axis 5 of the turboprop engine 2. Consequently, it can be seen that the rigid structure 10 is also symmetric about the vertical plane defined by the longitudinal axis 34 and the Z direction of the pylon 4.

Figure 4:
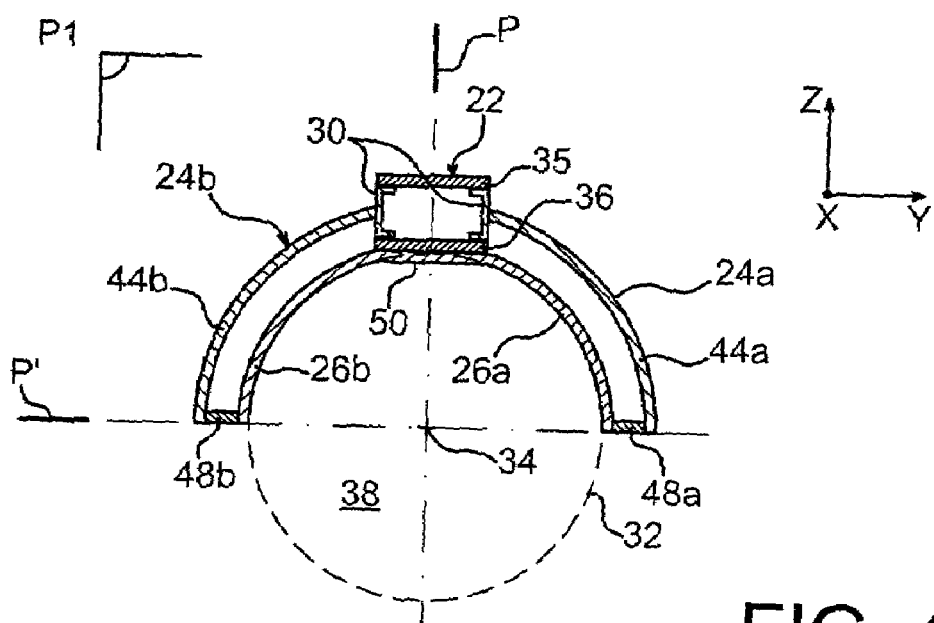
FIG. 4 shows a sectional view taken along the transverse plane P1 in FIG. 3.

FIG. 4 shows a sectional view along a transverse plane P1 passing arbitrarily through the lateral boxes 24a, 24b.

In this figure, it can be seen that the outside surface of the two lower skins 26a, 26b delimits a part of the fictitious approximately cylindrical surface 32 with a circular section, and that the two boxes 24a and 24b actually form a portion of an approximately cylindrical envelope/cage with a semi-circular section centred on the longitudinal axis 34, as will also be described with reference to FIG. 5.

Note that to create the least possible disturbance to the fan flow output from the annular fan duct 14, the diameter of the fictitious cylindrical surface 32 is preferably approximately the same as the diameter of the outside cylindrical surface 18 of the annular part of the fan case 12. Furthermore, as can be seen in FIG. 4, the elements of the central box 22 only project over a very small distance inside the space 38 delimited by the fictitious surface 32, such that they do not significantly disturb the fan air flow. This is particularly explained by the fact that the lateral spars 30 have an extremely small height along the Z direction compared with the diameter of the fictitious surface 32 and the outside surface 18.

Figure 5:
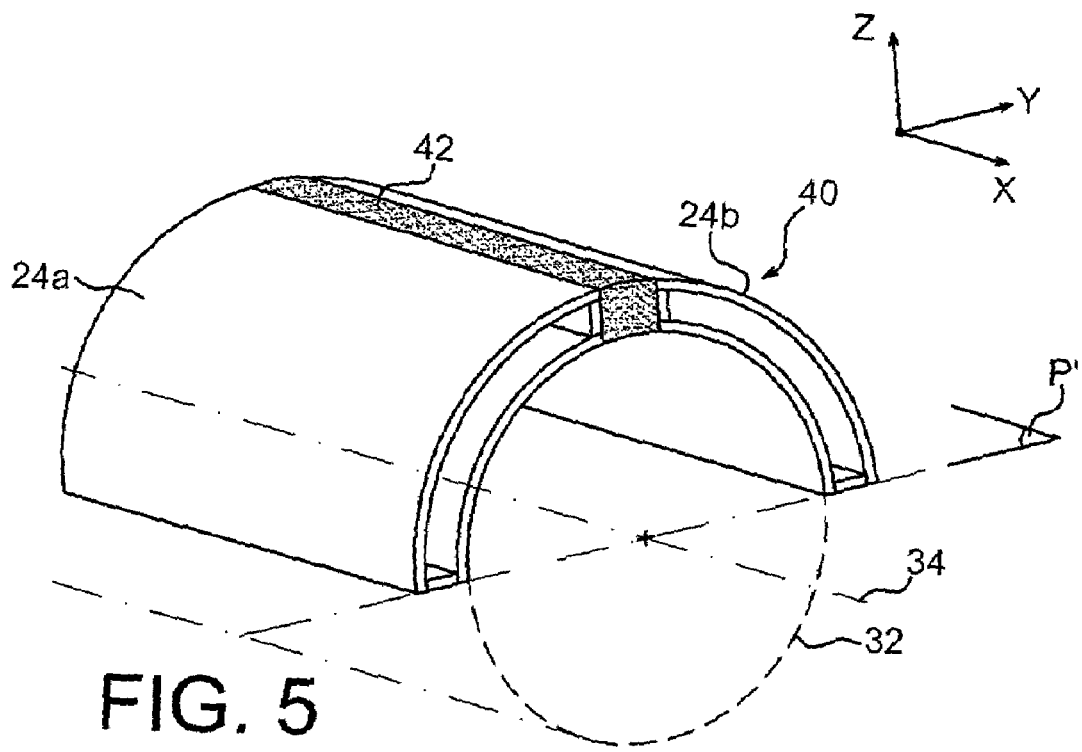
FIG. 5 shows a perspective view that will explain the shape of the lateral boxes designed to partially form the suspension pylon in FIG. 3.

FIG. 5 diagrammatically illustrates the preferred shape of the lateral boxes 24a, 24b, showing that they jointly form only part of an approximately cylindrical envelope/cage 40 with a semi-circular section, centred on the longitudinal axis 34 and surrounding the upper half of the fictitious surface 32. Thus, in this FIG. 5, the part 42 shown in cross-hatched corresponds to the part missing from the two boxes 24a, 24b to form the complete half cylinder 40. For guidance, note that this part 42 on the pylon shown in FIGS. 3 and 4 is actually replaced by a part of the central box 22 projecting very slightly inside the fictitious surface 32 and joining the two boxes 24a, 24b. Furthermore, this representation also helps to understand the fact that these two lateral boxes substantially form an extension towards the aft direction of the peripheral annular part of the fan case 12.

Figure 6:
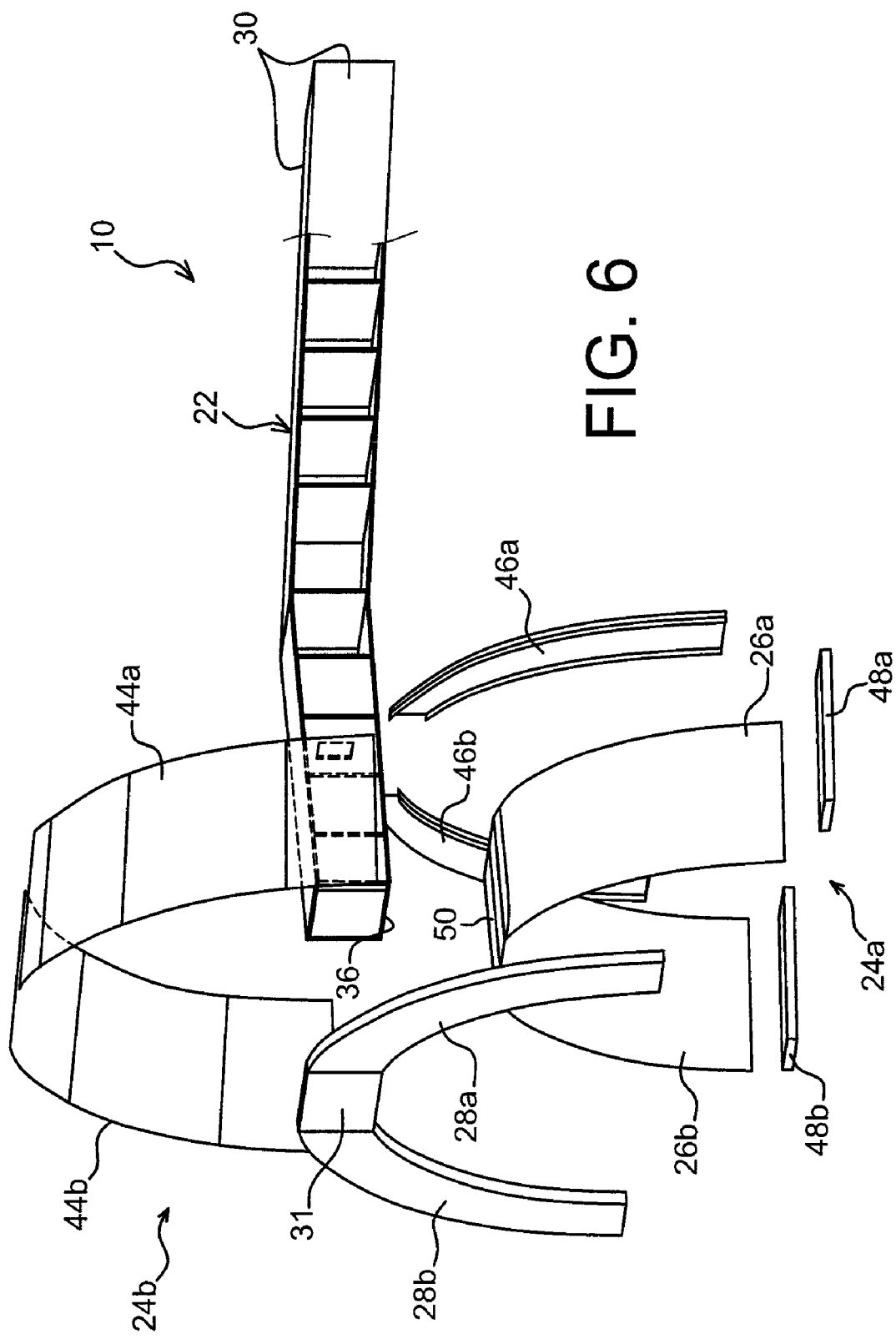
FIG. 6 shows a perspective exploded view of the view shown in FIG. 3.

With reference to FIGS. 5 and 6 jointly, it can be seen that the lateral box 24a, identical to and symmetrical to the lateral box 24b, comprises the lower skin 26a parallel to the X direction and forming a portion of a cylindrical element with a circular section, and an upper skin 44a also parallel to the X direction and also forming a portion of a cylindrical element with a circular section. The skins 26a and 44a are preferably concentric.

The skins 26a, 44a are connected to each other through a forward closing frame 28a and an aft closing frame 46a, therefore these frames 28a, 46a being oriented transversely and located forward and aft from box 24a respectively. Furthermore, a closing plate 48a parallel to the plane P' and preferably through which this plane passes, therefore closes a lower part of the box 24a and connects the lower end of the frames 28a, 46a and the skins 26a, 44a.

Naturally, the lateral box 24b comprises elements 26b, 44b, 28b, 46b and 48b, identical to elements 26a, 44a, 28a, 46a and 48a respectively of the box 24a.

As can be seen in FIGS. 5 and 6, it could be arranged that the two lower skins 26a, 26b are made in a single piece and are connected to each other at their upper part through a junction plate 50 oriented along an XY plane and in contact with the lower spar 36 of the central box 22. Obviously, this plate 31 with exactly the same width as the lower spar 36 projects slightly inside the fictitious surface 32.

Similarly, it would also be possible that the two forward closing frames 28a, 28b are made in a single piece and are connected to each other at their upper part through a forward closing frame 31 of the box 22, this frame 31 being oriented along a YZ plane. Consequently, in this configuration, the frames 28a, 28b, 31 made of a single piece are therefore arranged in the same YZ plane and form a forward end of the rigid structure 10 of the pylon 4.

Furthermore, note that the upper ends of the frames 46a, 46b and the skins 44a, 44b are mounted fixed on the lateral spars 30 of the central box 22, for example using mechanical assembly means.

Figure 7:
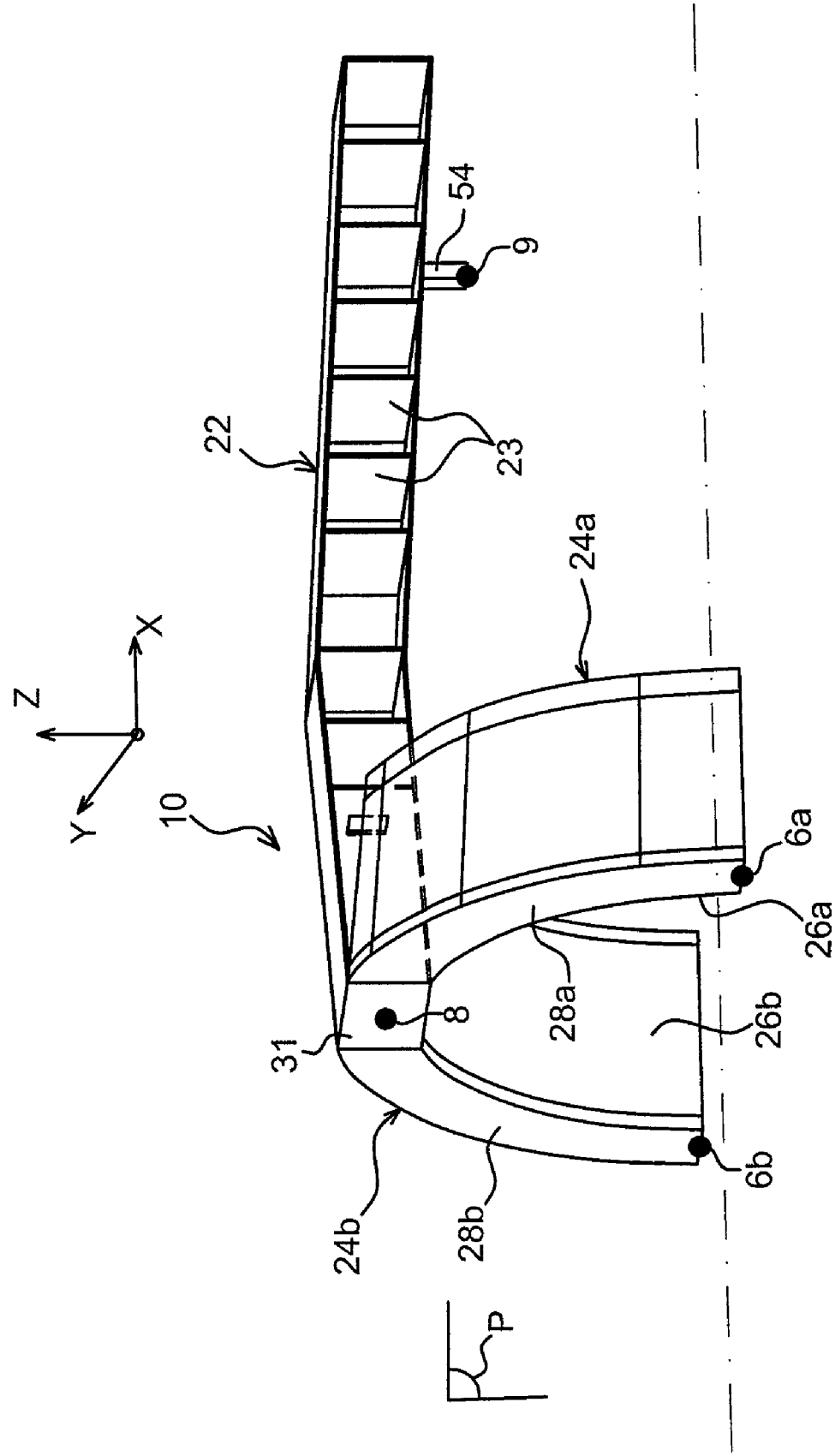
FIG. 7 shows a view similar to that shown in FIG. 3, to which a diagrammatic representation of the engine suspensions of the suspension pylon is added.

With reference to FIG. 7, it can be seen that the rigid structure 10 of the suspension pylon 4 is quite suitable to resist engine forward suspensions 6a, 6b, 8, because they can easily be fixed onto the transverse part made from a single piece integrating the frames 28a, 28b and 31. Actually, the first and second suspensions 6a, 6b are fixed to the two lower ends of the two forward closing frames 28a, 28b respectively so that the plane P' passes through them, while the third suspension 8 is fixed to the forward closing frame 31 located between the above-mentioned frames 28a, 28b. Therefore in this way, it should be understood that the two engine forward suspensions 6a, 6b are arranged symmetrically about the vertical plane defined by the longitudinal axis 34 and the Z direction of the pylon 4, in the same way as this same plane identical to the first plane P mentioned above passes through the third engine suspension 8.

The engine aft suspension 9 is fixed below the central box 22 by means of a support 54 fixed to the lower spar 36. This support 54 extends from the lower spar 36 along the Z direction and downwards over a sufficiently long distance to enable the suspension 9 to be mounted on the exhaust case 17 of the turbojet 2.

For guidance, all of the elements making up the rigid structure 10 that has just been described can be made using metallic materials such as steel, aluminium or titanium, or using composite materials, preferably carbon.

Figure 8:
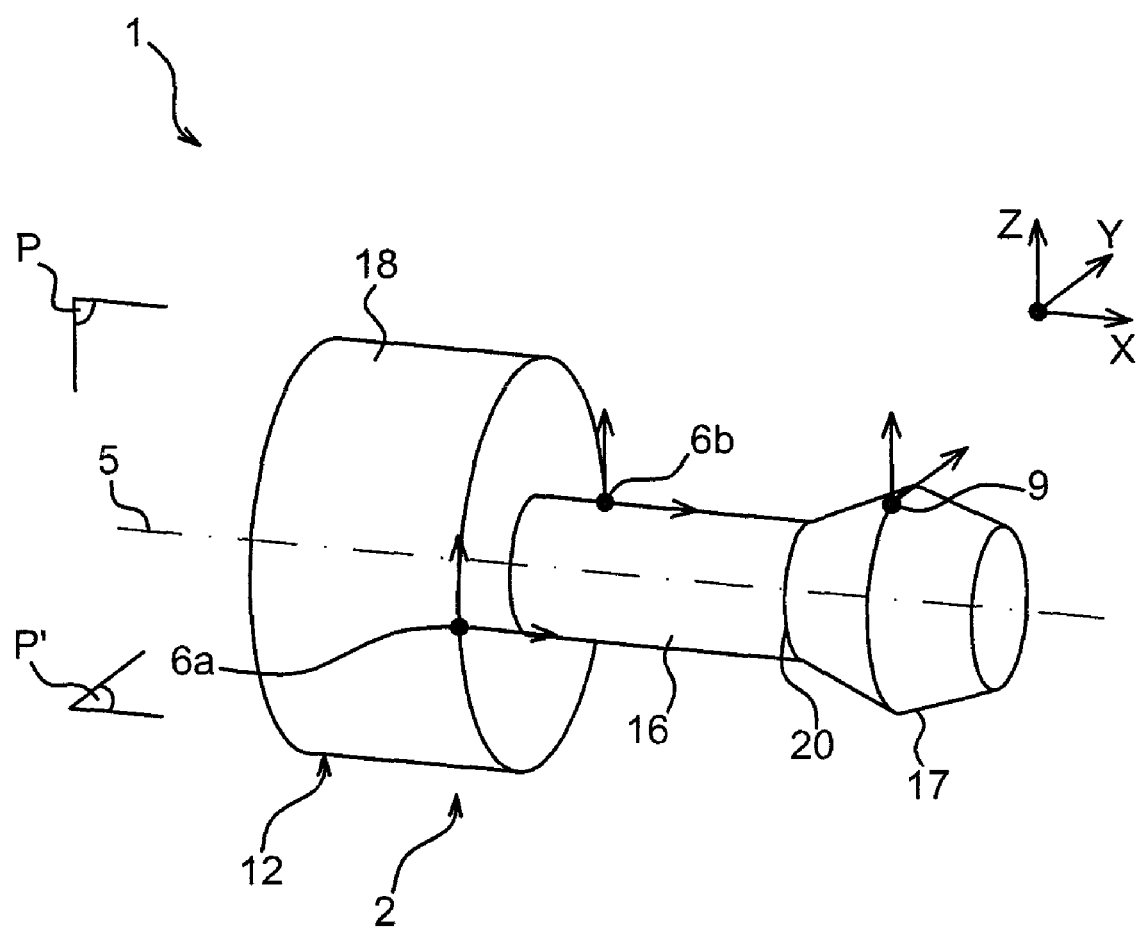
FIG. 8 shows a view similar to that shown in FIG. 2, in which the suspension pylon engine suspensions are in the form of an alternative.

FIG. 8 shows an engine assembly 1 for an aircraft according to an alternative of the preferred embodiment presented above (the rigid structure of the suspension pylon not being shown).

This assembly is similar to that described in the context of the first preferred embodiment. Thus, the elements marked with the same numeric references correspond to identical or similar elements.

The main difference in this second preferred embodiment consists of eliminating the third engine forward suspension, and arranging that the engine aft suspension 9 not only resists the moment applied along the Z direction, but also the moment applied along the Y direction. Thus, this alternative also gives a plurality of engine suspensions forming a statically determinate mounting system.

Obviously, those skilled in the art could make various modifications to the suspension pylon 4 of the turbojet 2 for an aircraft that has just been described, solely as a non-limitative example. In particular, for example, it is worth mentioning that although the pylon 4 has been presented in an adapted configuration for it to be suspended under the aircraft wing, this pylon could also be presented in a different configuration so that it could be mounted above this wing, or even in the aft part of the aircraft fuselage.

The invention claimed is:

1. A turbojet suspension pylon for an aircraft, comprising:
a rigid structure including a longitudinal central box and two lateral boxes fixed to a forward part of the central box, each of the lateral boxes including an upper skin and a lower skin; and
a first and a second engine forward suspensions to resist forces applied along a longitudinal direction of the pylon, the first and the second engine forward suspensions arranged on the two lateral boxes, respectively, and interposed between the rigid structure and a turbojet, wherein
each lateral box is closed at a forward end by a forward closing frame oriented along a plane defined by a transverse direction and a vertical direction of the pylon, the central box is closed at a forward end in the same plane as the lateral boxes, and
the first and second engine forward suspensions are fixed to the two forward closing frames of the lateral boxes, respectively.

2. A turbojet suspension pylon for an aircraft according to claim 1, wherein the two lower skins together delimit a part of a substantially cylindrical surface with a circular section and a longitudinal axis.

3. A turbojet suspension pylon for an aircraft according to claim 2, wherein the two lateral boxes together form a part of a substantially cylindrical envelope with a semi-circular section.

4. A turbojet suspension pylon for an aircraft according to claim 2, wherein a plane defined by the longitudinal axis of the surface and a transverse direction of the pylon passes through the first and second engine forward suspensions.

5. A turbojet suspension pylon for an aircraft according to claim 2, wherein the first and second engine forward suspensions each resist forces applied along the longitudinal direction of the pylon, and along a vertical direction of the pylon.

6. A turbojet suspension pylon for an aircraft according to claim 5, further comprising:
a plurality of engine suspensions including the first and second engine forward suspensions located symmetrically about a plane defined by the longitudinal axis of the surface and the vertical direction of the pylon;
a third engine forward suspension through which the plane passes; and
an engine aft suspension fixed to the longitudinal central box.

7. A turbojet suspension pylon for an aircraft according to claim 6, wherein the third engine suspension only resists forces applied along the transverse direction of the pylon, and the engine aft suspension only resists forces applied along the vertical direction of the pylon.

8. A turbojet suspension pylon for an aircraft according to claim 6, wherein the plurality of engine suspensions are mounted to the turbojet suspension pylon such that the plurality of engine suspensions form a statically determinate mounting system.

9. A turbojet suspension pylon for an aircraft according to claim 5, further comprising:
a plurality of engine suspensions including the first and second engine forward suspensions located symmetrically about a plane defined by the longitudinal axis of the surface and the vertical direction of the pylon; and
an engine aft suspension fixed to the longitudinal central box.

10. A turbojet suspension pylon for an aircraft according to claim 9, wherein the engine aft suspension resists forces applied along the transverse direction of the pylon and along the vertical direction of the pylon.

11. A turbojet suspension pylon for an aircraft according to claim 1, wherein the suspension pylon is configured to be disposed in an aircraft.

* * * * *